R. A. FESSENDEN.
APPARATUS FOR THE TRANSMISSION OF ENERGY BY ELECTRIC OSCILLATION.
APPLICATION FILED AUG. 26, 1904.

1,156,677.

Patented Oct. 12, 1915.

3 SHEETS—SHEET 1.

WITNESSES.
Herbert Bradley
Dwight Bartow

INVENTOR.
Reginald A. Fessenden
by his ATTORNEY.
Dennis S. Wolcott

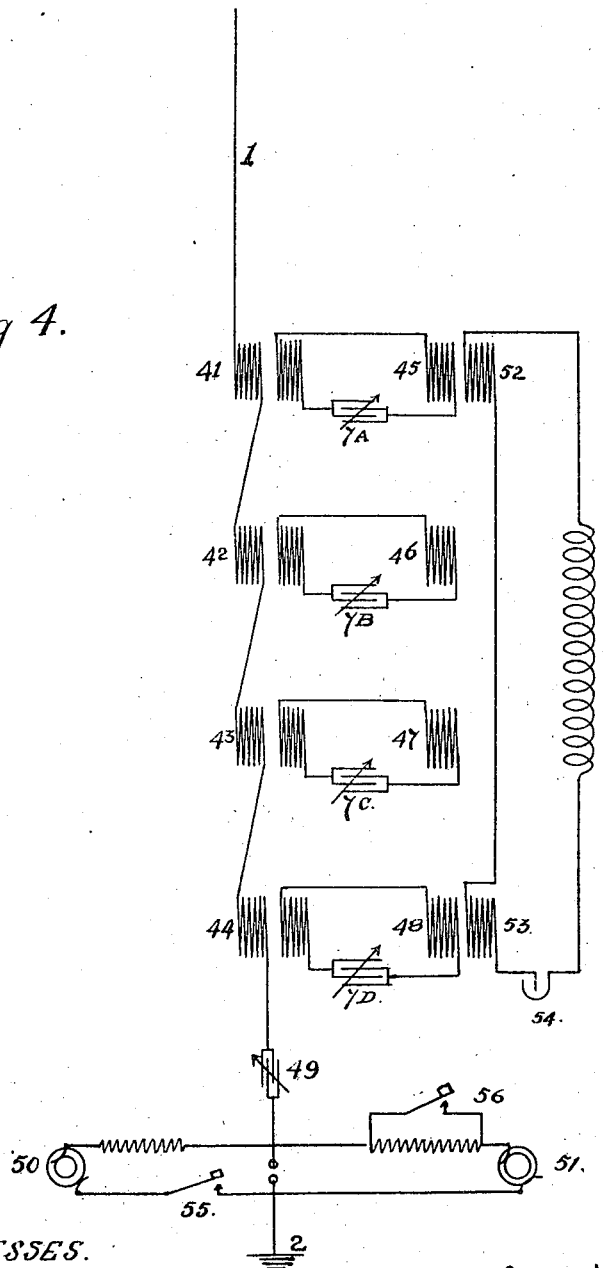

R. A. FESSENDEN.
APPARATUS FOR THE TRANSMISSION OF ENERGY BY ELECTRIC OSCILLATION.
APPLICATION FILED AUG. 26, 1904.
1,156,677.
Patented Oct. 12, 1915.
3 SHEETS—SHEET 3.
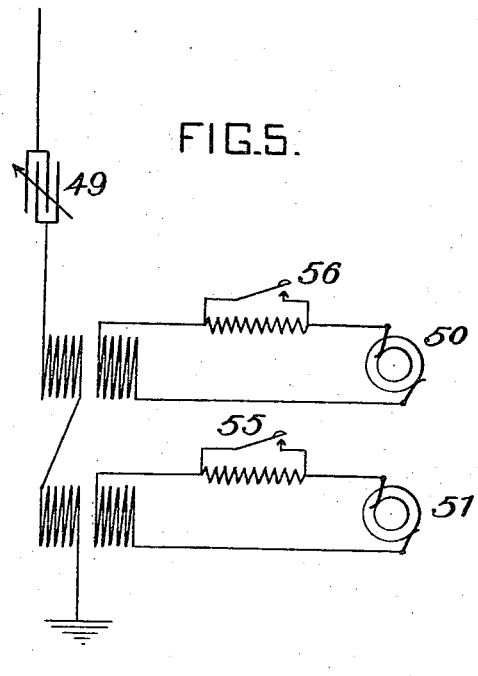
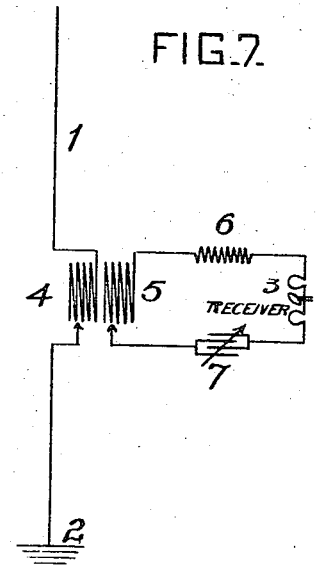
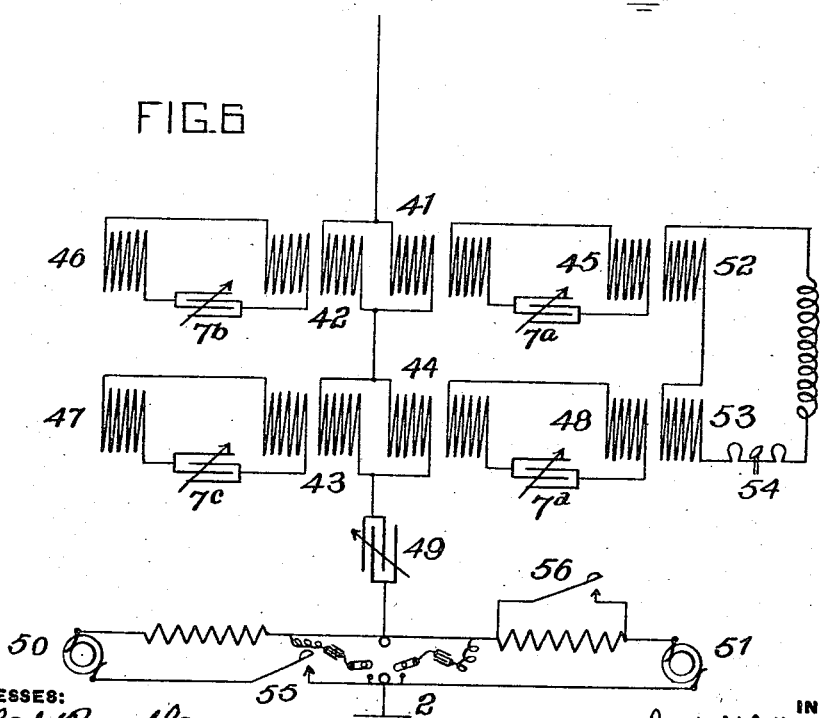
WITNESSES:
INVENTOR

UNITED STATES PATENT OFFICE.

REGINALD A. FESSENDEN, OF WASHINGTON, DISTRICT OF COLUMBIA, ASSIGNOR, BY MESNE ASSIGNMENTS, TO SAMUEL M. KINTNER, OF PITTSBURGH, PENNSYLVANIA, AND HALSEY M. BARRETT, OF BLOOMFIELD, NEW JERSEY, RECEIVERS.

APPARATUS FOR THE TRANSMISSION OF ENERGY BY ELECTRIC OSCILLATION.

1,156,677.                Specification of Letters Patent.        Patented Oct. 12, 1915.

Application filed August 26, 1904. Serial No. 222,299.

*To all whom it may concern:*

Be it known that I, REGINALD A. FESSENDEN, a citizen of the United States, residing at Washington, in the District of Columbia, have invented certain new and useful Improvements in Apparatus for the Transmission of Energy by Electric Oscillation, of which the following is a specification.

The invention herein described relates to certain new and useful improvements in the transmission of energy by electric oscillations, and has reference more particularly to the transmission of intelligence by oscillatory currents, and more particularly still to wireless telegraphy by electromagnetic waves.

Figure 1:
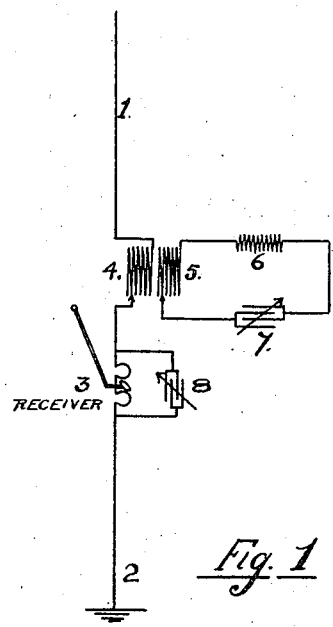
Figure 2:
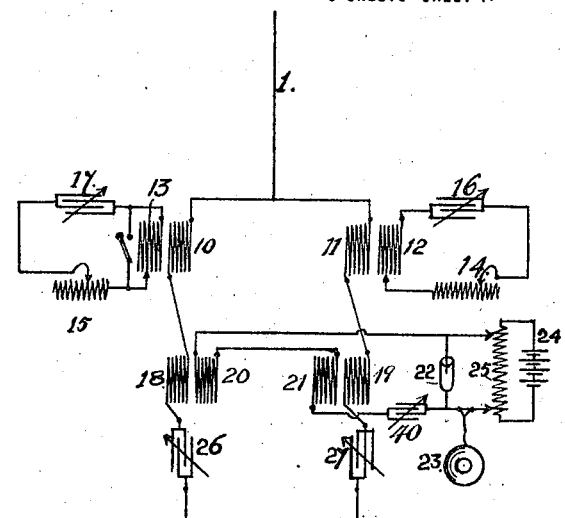
Figure 3:
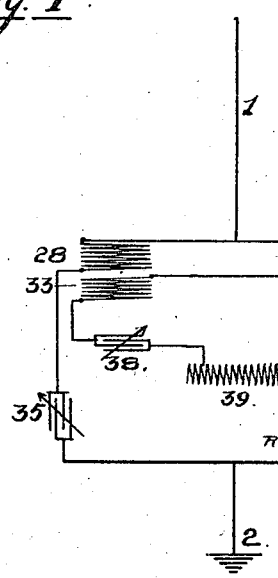

In the drawings forming a part of this specification, Figures 1, 2, and 3 show various forms of the inventions herein described. Fig. 4 shows a sending apparatus. Figs. 5, 6, 7 illustrate modifications of certain parts of the apparatus.

In Fig. 1, 1 is an aerial grounded to 2, and having in series therewith an inductance 4 preferably wound on insulating material and forming the primary of a transformer whose secondary is 5. 3 is a receiver which may be placed either directly in the ground connection of the aerial or may be connected inductively by means of a transformer with tuned secondary in the manner well known in the art. Here the receiver is conductively connected to the aerial, a condenser 8 may be placed in shunt to the receiver so that the circuit 3, 8 is resonant to the received oscillations. The secondary coil 5 has preferably in series with it an inductance 6 and capacity 7. The number of turns on the primary 4 and the secondary 5 are preferably the same, and they are preferably wound so as to have a large mutual inductance.

The circuits are so arranged that when the inductance of the coil 4 is neutralized to a predetermined degree which is preferably practically zero, the conductor, meaning by this the circuit from the top of the aerial to ground, is in tune with the oscillations to be received, but that when the inductance of the coil 4 is not so neutralized the said conductor is not in tune.

On account of the fact that when the secondary of a transformer is short-circuited it nullifies or renders practically zero the inductance of the primary, while when it is open circuited the inductance of the primary is but practically little affected, it will be seen that if a current is caused to flow in the secondary 5 the inductance of the circuit 4 will be altered, and if the secondary of the circuit 5 be rendered wholly, or practically short circuited for one particular frequency, that the inductance of the circuit 4 will be wholly or practically wholly nullified for that same frequency. Circuit 5, 6, 7 may be practically short circuited to one frequency by resonance. If this frequency at which the secondary becomes virtually short circuited, be that of the waves which it is desired to receive, then in that case, when oscillations of this frequency are received the inductance of the coil 4 will be rendered practically zero or as close to zero as may be desired, and the whole wireless signaling circuit will become resonant to the frequency of the received oscillations. For any other frequency, however, this will not be the case, because the circuit 5, 6, 7 not being resonant to this other frequency, the inductance 4 will not be neutralized or varied to the extent desired and hence the wireless signaling circuit will not be in tune and will have a different period from the receiver circuit 3, 8.

The secondary 5 may be caused to be practically short circuited, wholly or to any desired extent by extending the ends of the secondary circuit so that the secondary circuit is resonant to the desired frequency. This effect may also be produced, and more conveniently, by placing the condenser 7, preferably a variable one in the secondary circuit, and having a self-induction 6 also in series. The presence of self-induction 6 either distributed or local is necessary because when the secondary 5 is operating its inductance is practically entirely nullified or at least nullified to the extent desired, and consequently it is necessary to have other inductance to take its place or it would not be possible to tune the circuit containing capacity only.

Numerous other ways will readily suggest themselves whereby the broad method herein described may be carried into effect, but as these equivalents are well known in the art it is unnecessary to mention the various permutations and combinations which may be entered.

Fig. 2 shows an alternative form in which 1 is the vertical, grounded at 2; 10 and 11 are inductances forming the primaries to the transformers whose respective secondaries are 12 and 13; 14 and 15 are coils, 16 and 17 are capacities either variable or fixed, 18 and 19 are primaries of transformers whose secondaries 20 and 21 are connected to oppose each other and preferably have in series with them the receiver 22 and potentiometer 25. 40 is a capacity, 23 an indicating mechanism and 24 a source of current. 26 and 27 are capacities, preferably variable, and forming a part of the ground connection of the vertical 1.

The circuit of the secondary, 12, 14, 16 is preferably tuned to the oscillation to be received, and the circuit 1, 11, 19, 27, 2 is also arranged so as to be resonant to the same frequency when waves of this frequency affect the wireless signaling circuit and cause the secondary circuits 12, 14, 16 to neutralize the inductance of primary winding 11 to the desired extent. It will readily be understood that it is preferable to have the circuit 12, 14, 16 so strongly resonant and with so little resistance that secondary winding 12 will be practically short circuited for oscillations of the desired frequency, and therefore entirely, or practically entirely, neutralizes the self-inductance of the coils 11, but that where the inductance of 11 is not neutralized entirely the circuits, 1, 11, 19, 27, 2 may be brought into resonance by slightly diminishing the capacity 27.

The secondary circuit 13, 15, 17 is arranged so that secondary winding 13 will not be in short circuit when oscillations of the desired frequency are received and consequently the inductance 10 will not be neutralized, and the circu' 1, 10, 18, 26, 2 will not be resonant to the desired frequency. In most cases the inductance 15 and capacity 17 may be omitted, the circuit being left open.

The secondary circuit 20, 21, 22, is preferably tuned to the frequency of the desired oscillations.

The coil 10 is preferably made similar to the coil 11, and the transformer 18, 20 to the transformer 19, 21. The secondary 13 may in many cases be omitted. All coils, windings and capacities may be adjustable.

Good effects may also be obtained as shown in Fig. 3 by omitting the primaries 10 and 11 Fig. 2. In this case the secondary circuit 30, 31, 32 corresponding to the secondary circuit 12, 14, 16 of Fig. 2 is placed in inductive relation to the primary 29 corresponding to the primaries 11 and 19 of Fig. 2. 28 is the other primary, 33, 34 are opposing secondaries in the circuit of the receiver 37 which may also have the inductance 39 and capacity 38 and is preferably tuned to the received oscillations. 35, 36 are the capacities and 1 is a vertical grounded at 2.

A receiver preferably of low resistance may be used in 5, 6, 7 as shown in Fig. 7 and if it has an inductance it may be used in lieu of 6 in which case receiver 3 may be omitted.

Many equivalent connections, both conductive and inductive, will readily suggest themselves to those skilled in the art but that herein shown i. e. one arranged to balance the effects of disturbing influences on one or more receivers for all frequencies except those which it is desired to receive is herewith sufficiently shown and disclosed.

This method of selecting oscillations of a predetermined frequency is radically and entirely distinct from all methods heretofore used and possesses numerous very valuable features. One very valuable feature is that by this means it becomes possible to cut out the effect of atmospheric disturbances.

The effects of lightning disturbances or atmospheric disturbances fall into two classes, one class being electromagnetic wave disturbances produced when the electrical storm is at some distance; and the other, the electrostatic disturbances produced when the storm is in the neighborhood. The former of these is readily eliminated by sharp tuning, but the second cannot be so eliminated for the following reasons: When a cloud in the neighborhood acting by electrostatic induction on the vertical, and causing a charge to accumulate on the vertical, is discharged, as by a lightning flash, the charge on the vertical is also set free and oscillates up and down on the wireless conductor. It is evident that this oscillation will take place with the same frequency as the natural period of the conductor, and this in other systems is generally tuned to the frequency of the oscillations it is desired to receive. Hence the oscillations caused by atmospheric electrostatic disturbances will have the same period as the waves which it is desired to receive and cannot be tuned out. On the other hand if the wireless conductor be tuned to a frequency different from that of the local circuit and from the frequency of the oscillations to be received, the receiving conductor is not a good absorber of the oscillations to be received, because it is out of tune with them, and consequently the ratio of the effects of the atmospheric disturbances and the signals to be received is not improved. On the other hand with the method here shown and described the wireless conductor is tuned to the oscillations which it is desired to receive, while such oscillations are being received but it is untuned to oscillations of this same frequency when oscillations of a different frequency are being received. Consequently electrostatic disturbances cause oscillations of a frequency differing from the frequency of the receiving conductor and consequently do not affect the receiver. In this way the effect of electrostatic atmospheric disturbances, as well as electromagnetic atmospheric disturbances is entirely done away with and neither periodic nor aperiodic disturbances can produce an effect on the receiver.

A second very valuable feature of this invention is that since the circuits, for example in Fig. 2, are entirely balanced (were it not for the effect of the secondary circuit 12, 14, 16) the intensity and selectivity of the indication produced on the receiver depends upon the degree of resonance of the circuit 12, 14, 16.

In addition sharp resonance can be obtained by the use of this method irrespective of whether the receiver is adapted for sharp tuning or not.

In the operation of this invention, for example the form shown in Fig. 2, disturbing influences divide equally between the two branch circuits since these are symmetrical for nonresonant impulses. When the right frequency comes along, however, at first the oscillations divide as before, but now a current is set up in the circuit 12, 14, 16 which tends to diminish the self-induction of the primary 11. This self-induction being diminished, the circuit, 1, 11, 19, 27, 2 is more closely in resonance than the other, and more current flows through it. This causes still more current to flow through 12, 14, 16 and brings the circuit, 1, 11, 19, 27, 2 still closer into resonance, until finally it has come entirely into resonance whereupon it remains locked in this condition and practically the entire current flows through the circuit 1, 11, 19, 27, 2.

By suitable modifications the above mentioned apparatus can be advantageously applied to sending conductors and used for sending as shown in application Serial No. 222,301 filed August 25, 1904, and in Fig. 4 of this case.

The number of turns and windings and the inductance of corresponding coils may be equal and for some purposes are preferably equal, but they may be either larger or smaller while still utilizing the method herein described and claimed.

As stated, the method may be applied to sending. For example in Fig. 4, 1 is an aerial grounded at 2; 41, 42, 43, 44 are inductances in the antenna circuit; 45, 46, 47, 48 are secondary circuits tuned to different frequencies and similar to the circuits described previously. 52 and 53 are secondaries connected with the inductance of the circuits 45 and 48 and operatively connected to the receiver 54, preferably by means of a tuned circuit.

49 is a condenser which may be placed in the aerial for tuning or other purposes. 50 and 51 are means for producing oscillations of two different periods similar to the means described in U. S. Patent #706,742 with reference to Fig. 10 with the local circuit omitted as here another means of receiving and sending simultaneously is shown used, though the method shown in said Fig. 10 may also be used.

The secondary circuits 46 and 47 are tuned to the frequencies generated by 50 and 51, the circuit 48 is tuned to the frequency of the oscillations which it is desired to receive and the circuit 45 may be what is called a dead tune i. e. a tune which is not being used by any station.

The circuits are so arranged that when a frequency is sent or received corresponding to the period of one of the secondaries 45, 46, 47, 48, that circuit neutralizes the self-inductance of the corresponding coil 41, 42, 43 or 44 to a predetermined extent and brings the wireless conductor into tune for that particular frequency. It will therefore be seen that when the key 55 is depressed the wireless signaling circuit resonates to the frequency generated by 50 and when the key 56 is depressed the wireless conductor resonates to the same frequency as that generated by 51 and that when both are depressed it resonates to both frequencies. Similarly when a frequency is received corresponding to the frequency of 48, the wireless signaling circuit resonates to that frequency and the receiver 54 is affected.

From the above it will be understood that by the practice of my method the conductor is resonant at the same time to more than one oscillation frequency.

The secondaries 52 and 53 are wound so as to oppose each other, and hence any frequency other than that of the circuit 43 whether produced inside the station or received from outside is neutralized so far as its affect upon 54 is concerned.

The generating sources 50 and 51 may be connected in series, as shown in Fig. 5, instead of in parallel.

The other circuits are shown in Fig. 4 in series, but may also be arranged in parallel, as shown in Fig. 6, or in parallel series, and a great many combinations are possible by employing methods well-known in the art, and which therefor I broadly claim.

The term "wireless circuit" is herein used to include not merely the circuit connected to the antenna, but also the antenna itself.

What I claim and desire to secure by Letters Patent is:—

1. Apparatus for wireless signaling, comprising a circuit having branches rendered resonant simultaneously to several oscillation frequencies not harmonic to one another, and an auxiliary signaling apparatus in a circuit linked with said branch circuits, substantially as described.

2. Apparatus for wireless signaling, comprising two local branch circuits of similar construction and normally equal, combined with a third circuit having electrical constants differing therefrom to a small but definite degree, and adapted to be energized by said branch circuits.

3. Apparatus for wireless signaling, comprising an auxiliary and two similarly constructed parallel branch receiving circuits, the latter being normally equal and containing like inductive devices arranged to oppose each other in their effects on the receiver.

4. Wireless signaling apparatus, comprising two parallel circuits similarly constructed and having the same electrical characteristics, and a third circuit connected therewith and having inductive devices with constants differing to a slight but predetermined degree from those of the parallel circuits, said inductive devices being connected to oppose each other in the third circuit.

5. A wireless receiving system, including in combination two parallel circuits, and a receiving circuit connected therewith by similarly constructed transformers with similar electric constants, said transformers being connected to oppose each other in the receiving circuit, a closed circuit resonant to the frequency of the signaling oscillations and inductively connected with one of said similarly constructed parallel circuits, the latter circuits being equal except as affected by the closed circuit.

6. In a wireless telegraph receiving system, an antenna, a circuit consisting of two branches connecting said antenna to earth, each branch including the primary of a transformer, and secondary windings inductively related to said primary windings and forming part of the same tuned receiving circuit, said windings being arranged to oppose each other in their effects on the receiver.

7. In a wireless telegraph receiving system, an antenna, a circuit consisting of two branches connecting said antenna to earth, an adjustable primary winding in each of said branches, and adjustable secondary windings inductively related to each of said primary windings and forming part of the same tuned receiving circuit.

Signed at Washington, in the District of Columbia, this 25th day of August, A. D. 1904.

REGINALD A. FESSENDEN.

Witnesses:
  THOMAS P. BROWN,
  LEONA FEATHERS.